(12) United States Patent
Zhou et al.

(10) Patent No.: US 11,297,703 B1
(45) Date of Patent: Apr. 5, 2022

(54) LED DRIVER WITH INPUT VOLTAGE COMPENSATION

(71) Applicant: Cuvee Systems, Inc., San Jose, CA (US)

(72) Inventors: Dongsheng Zhou, Cupertino, CA (US); Lanh Cong Nguyen, Santa Clara, CA (US)

(73) Assignee: Cuvee Systems, Inc., San Jose, CA (US)

( * ) Notice: Subject to any disclaimer, the term of this patent is extended or adjusted under 35 U.S.C. 154(b) by 0 days.

(21) Appl. No.: 17/090,632

(22) Filed: Nov. 5, 2020

Related U.S. Application Data

(60) Provisional application No. 62/931,700, filed on Nov. 6, 2019.

(51) Int. Cl.
*H05B 45/34* (2020.01)
*H05B 45/355* (2020.01)
*H05B 45/10* (2020.01)

(52) U.S. Cl.
CPC ............. *H05B 45/34* (2020.01); *H05B 45/10* (2020.01); *H05B 45/355* (2020.01)

(58) Field of Classification Search
CPC ....... H05B 45/34; H05B 45/10; H05B 45/355
See application file for complete search history.

(56) References Cited

U.S. PATENT DOCUMENTS

| | | | |
|---|---|---|---|
| 9,137,868 B2* | 9/2015 | Xu | H05B 45/3725 |
| 2011/0109245 A1* | 5/2011 | Lin | H05B 45/44 |
| | | | 315/294 |
| 2014/0265898 A1* | 9/2014 | Del Carmen, Jr. | |
| | | | H05B 45/3725 |
| | | | 315/200 R |
| 2015/0257217 A1* | 9/2015 | Ido | H05B 45/375 |
| | | | 315/246 |

* cited by examiner

*Primary Examiner* — Daniel D Chang
(74) *Attorney, Agent, or Firm* — Spano Law Group; Joseph S. Spano

(57) ABSTRACT

Methods and systems for improved dimming of LED based illumination devices are described herein. An AC input voltage provided to an LED driver is rectified and the rectified signal is divided down by a voltage divider circuit to supply electrical power to a dimming interface circuit. The fraction by which the voltage divider circuit divides down the rectified signal is controlled by a Dynamic Input Voltage Compensator (DIVC) based on the peak value of the rectified signal. In this manner, the DIVC increases the range of AC input voltage to the LED driver while maintaining efficiency and stability of the LED based illumination system by reducing the variation of the voltage supplied to the dimming interface circuit over a larger range of AC input voltage.

22 Claims, 6 Drawing Sheets

LED DRIVER WITH INPUT VOLTAGE COMPENSATION

CROSS REFERENCE TO RELATED APPLICATION

The present application for patent claims priority under 35 U.S.C. § 119 from U.S. provisional patent application Ser. No. 62/931,700, filed Nov. 6, 2019, the subject matter of which is incorporated herein by reference in its entirety.

TECHNICAL FIELD

The described embodiments relate to electrical power conversion and control, and more specifically, to electrical power conversion and control for solid state lighting devices.

BACKGROUND INFORMATION

Light emitting diode (LED) based illumination devices have emerged as a preferred technology for general illumination. The high efficiency of LEDs reduces electrical power consumption, making LEDs an environmentally attractive lighting solution. In many examples, municipalities at the city, state, and national level have enacted regulations requiring a transition from the use of incandescent light bulbs to LED based lighting devices.

Although incandescent bulbs are undesirable from the point of view of efficiency, dimming of incandescent bulbs is relatively simple. Traditionally, incandescent bulbs are dimmed by controlling the voltage supplied to the resistive filament itself. As the voltage is reduced, the current flow through the resistive filament is reduced, resulting in a reduction in light output. Conversely, as voltage is increased, the current flow through the resistive filament is increased, resulting in an increase in light output of the bulb. Various schemes have been developed to control the voltage supplied to the resistive filament of an incandescent lamp from a fixed AC electrical power source.

LEDs are by nature a diode, rather than a resistor. The light emitted from a conventional LED depends on the current supplied to the LED at a relatively low direct current (DC) voltage. In many practical applications, dimming the light output from an LED requires control of the current supplied to the LED and conversion of the relatively high AC input voltage to a low DC voltage.

The voltage level available from the electrical power grid varies depending on the adopted standard for electrical power. The adopted standard may depend on application (e.g., residential, industrial, etc.) and location (e.g., different countries). In some examples, the AC voltage level available from the electrical power grid may be anywhere in a range from 100 VAC to 277V AC. Various schemes have been developed to achieve LED dimming from a fixed AC electrical power source. However, current circuit designs are often unable to accommodate a large range of AC input voltage. Thus, different LED driver circuits or circuit elements are required depending on the application and location of installation. This complicates the supply chain for LED drivers as different LED drivers or differently configured LED drivers are required depending on the installation.

In summary, it is desirable to improve LED utilization and adoption by increasing the range of AC input voltage of dimmable LED drivers.

SUMMARY

Methods and systems for improved dimming of LED based illumination devices are described herein. An AC input voltage provided to an LED driver is rectified and the rectified signal is divided down by a voltage divider circuit to supply electrical power to a dimming interface circuit. The fraction by which the voltage divider circuit divides down the rectified signal is controlled by a Dynamic Input Voltage Compensator (DIVC) based on the peak value of the rectified signal. In this manner, the DIVC increases the range of AC input voltage to the LED driver while maintaining efficiency and stability of the LED based illumination system by reducing the variation of the voltage supplied to the dimming interface circuit over a larger range of AC input voltage.

In one aspect, a power converter includes a DIVC coupled to the output of a rectifier. The DIVC adjusts the ratio of resistance of a voltage divider of the power converter circuitry based on the amplitude of a rectified voltage signal. The adjustment of the ratio of resistance of the voltage divider stabilizes the value of the voltage provided at the center tap of the voltage divider over a large range of AC input voltage. The voltage at the center tap of the voltage divider is provided to sensitive control circuitry of the power converter employed to convert a relatively high value rectified voltage signal to a relatively low value DC voltage and control current supplied to the LEDs. In some embodiments, the sensitive control circuitry includes dimmer interface circuitry and dimmer circuitry that are destabilized if the supply voltage provided to the circuits does not fall within a relatively small voltage range. By stabilizing the value of the voltage provided at the center tap of the voltage divider, the control circuitry of the power factor correction converter is able to operate stably over a large range of AC input voltage.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for improved dimming of LED based illumination devices are described herein. An AC input voltage provided to an LED driver is rectified and the rectified signal is divided down by a voltage divider circuit to supply electrical power to a dimming interface circuit. The fraction by which the voltage divider circuit divides down the rectified signal is controlled by a Dynamic Input Voltage Compensator (DIVC) based on the peak value of the rectified signal. In this manner, the DIVC increases the range of AC input voltage to the LED driver while maintaining efficiency and stability of the LED based illumination system by reducing the variation of the voltage supplied to the dimming interface circuit over a larger range of AC input voltage.

Figure 1:
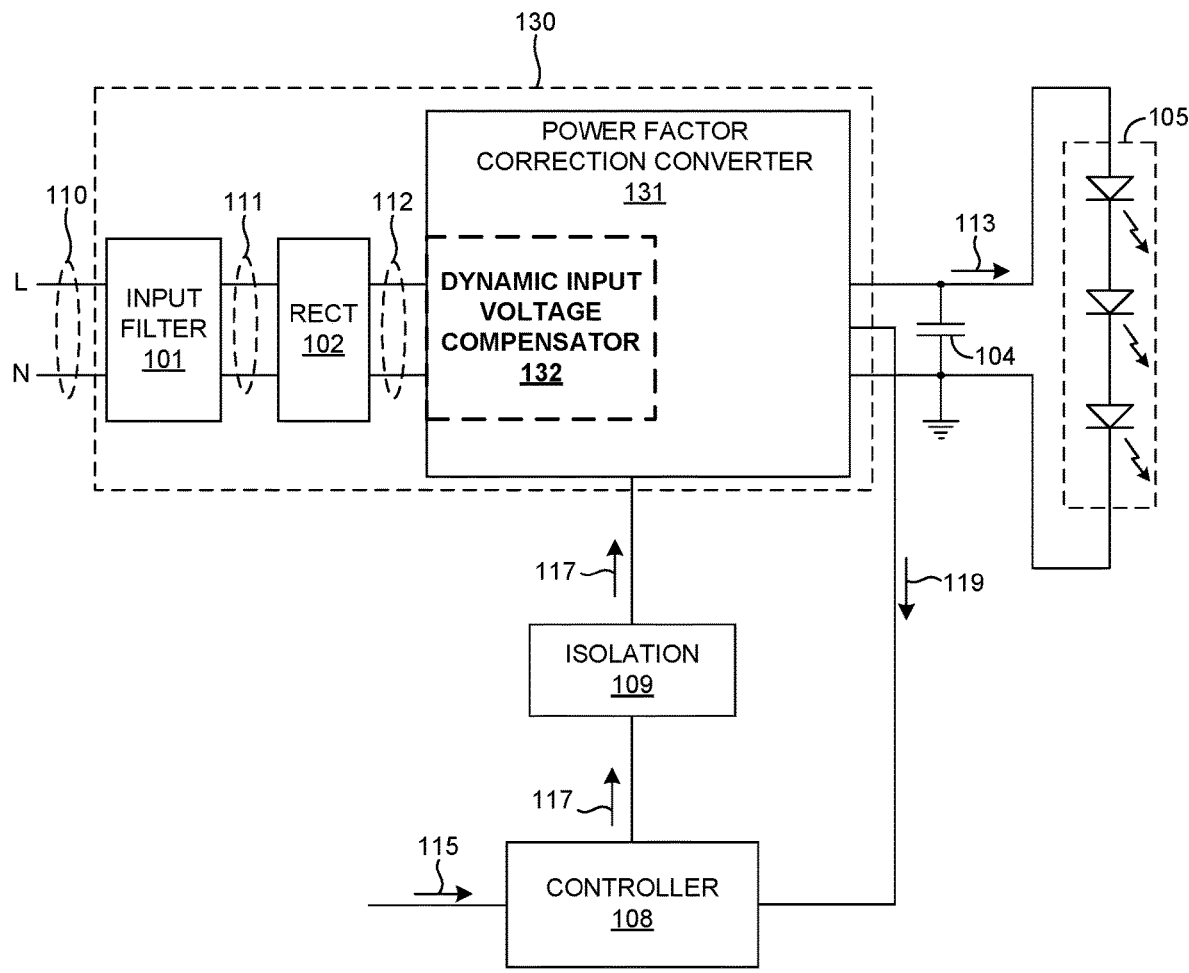
FIG. 1 depicts an illustration of an LED driver including a dynamic input voltage compensator in one embodiment.

FIG. 1 depicts an illustration of an LED driver in one embodiment. FIG. 1 depicts an LED string 105 including a number of LEDs electrically coupled in series. For purposes of this patent document, an LED string includes any combination of one or more LEDs electrically coupled in series, parallel, or a combination thereof. A single stage current controlled Alternating Current/Direct Current (AC/DC) converter 130 generates a controlled current employed to provide current 113 to power LED string 105 and current 119 to power controller 108. AC input signal 110 is received across input nodes, L, and N, of input filter 101. In some embodiments, AC input signal 110 is provided at a voltage at any possible value in a range from 80 VAC to 300 VAC. Input filter 101 protects the source of AC line power from unwanted electromagnetic interference by effectively blocking unwanted power spikes that may be generated by the AC/DC converter 120. Filtered AC input signal 111 is provided to rectifier 102. In one embodiment, rectifier 102 is a diode bridge that rectifies the filtered AC voltage into a rectified signal 112, e.g., a one directional half sine wave voltage signal 112. Power factor correction converter 131 is a switched mode isolated flyback converter that includes a primary side that generates a sine wave input current in phase with the rectified signal 112. This helps to achieve a high power factor (PF) and effective power factor correction (PFC). Power factor correction converter 131 also includes a secondary side that generates a controlled output current based on a command signal 117 received from controller 108. Bulk capacitor 104 filters out high frequency current components induced by switching elements of power factor correction converter 103 from the current 119 supplied to controller 108 and current 113 supplied to LED string 105.

Controller 108 controls the average lumen output of light emitted from LED string 105 by controlling the value of current 113 available to flow through LED string 105. In the embodiment depicted in FIG. 1, controller 108 communicates brightness control signal 117 to power factor correction converter 131 via isolation module 109. Isolation module electrically isolates the power factor correction converter 131 from controller 108 to prevent any human interaction with high voltages that may be present at power factor correction converter 131 and prevent any spurious spikes in electrical power from damaging controller 108. In some embodiments, isolation module 109 is implemented to transform brightness control signal 117 optically or magnetically to realize electrical isolation between controller 108 and power factor correction converter 131.

Power factor correction converter 131 receives the brightness control signal 117 indicative of a desired current flow 113 available to LED string 105. In turn, power factor correction converter 131 adjusts its output current to achieve the desired current flow, and consequently adjusts the input current flow 110 from the AC power source. In this manner, an adjustment in value of the brightness command signal changes the electrical power draw of the AC/DC converter 130 from the AC power source.

In some embodiments, controller 108 is implemented in analog format to minimize cost. In these embodiments, brightness command signal 115 is an analog signal (e.g., a signal communicated via a standard 0-10 Volt interface) received by controller 108. In turn, controller 108 generates brightness control signal 117 based on brightness command signal 115. In some embodiments, brightness control signal 117 is a PWM signal. In some other examples, brightness control signal 117 is an analog signal.

In some embodiments, controller 108 is implemented in digital format. In these embodiments, brightness command signal 115 is a digital signal (e.g., signal communicated via a standard digital interface such as digital addressable lighting interface (DALI) or a wireless communication interface such as WIFI or Bluetooth low energy (BLE)) received by controller 108.

In one aspect, power factor correction converter 131 includes a dynamic input voltage compensator 132 coupled to the output of rectifier 102. Dynamic input voltage compensator 132 adjusts the ratio of resistance of a voltage divider of the power factor correction converter circuitry based on the amplitude of the rectified voltage signal. The adjustment of the ratio of resistance of the voltage divider stabilizes the value of the voltage provided at the center tap of the voltage divider over a large range of AC input voltage (e.g., any value of AC input voltage between 80 VAC and 300 VAC). The voltage at the center tap of the voltage divider is provided to sensitive control circuitry of the power factor correction converter to control current supplied to the LEDs and conversion of the relatively high value rectified voltage signal 112 to a relatively low value DC voltage. In some embodiments, the sensitive control circuitry includes dimmer interface circuitry and dimmer circuitry that are destabilized if the supply voltage provided to the circuits does not fall within a relatively small voltage range, i.e., less than 80 VAC to 300 VAC. By stabilizing the value of the voltage provided at the center tap of the voltage divider, the control circuitry of the power factor correction converter is able to operate stably over a large range of AC input voltage (e.g., any value of AC input voltage between 80 VAC and 300 VAC).

Figure 2:
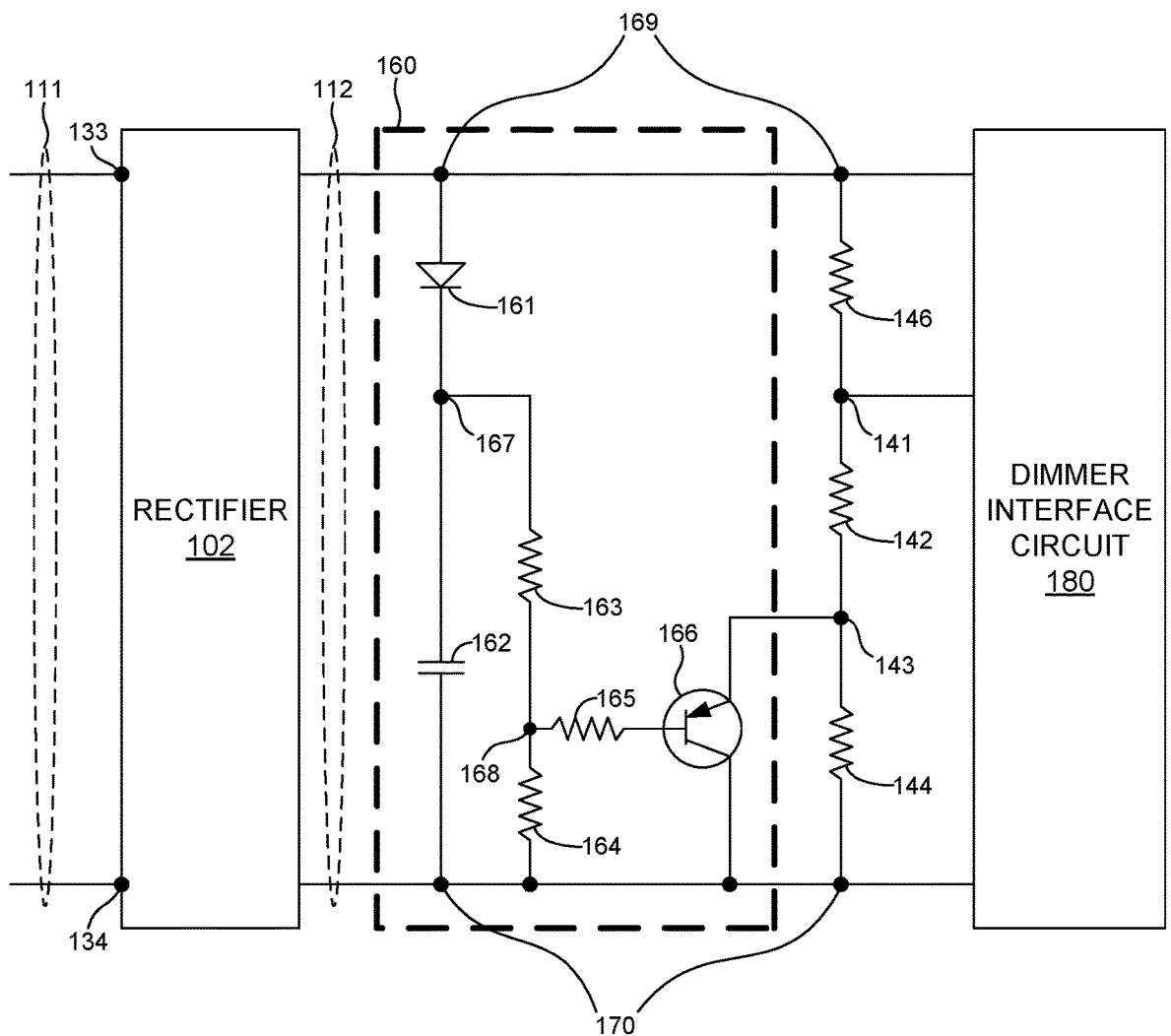
FIG. 2 depicts an illustration of an embodiment of a dynamic input voltage compensator in further detail.

FIG. 2 depicts a portion of power factor correction converter 131 in one embodiment, including a specific embodiment 160 of dynamic input voltage compensator 132 depicted in FIG. 1. As depicted in FIG. 2, rectifier 102 receives an Alternating Current (AC) input signal 111 across input nodes 133 and 134. Rectifier 102 rectifies the AC input signal and provides the rectified signal 112 on nodes 169 and 170. A voltage divider circuit including resistive elements 146, 142, and 144 is coupled to the output of rectifier 102. More specifically, resistive element 146 is coupled between node 169 and node 141, resistive element 142 is coupled between node 141 and node 143, and resistive element 144 is coupled between node 143 and node 170. For purposes of this patent document, a resistive element is any combination of resistors coupled in series, parallel, or any combination thereof, that exhibit an overall electrical resistance. The voltage divider circuit divides down the voltage of the rectified signal present at node 169 to a reduced voltage present at node 141. As depicted in FIG. 2, the voltage divider circuit provides the reduced voltage present at node 141 to dimmer interface circuit 180.

In one aspect, DIVC 160 operates to stabilize the voltage present on node 141 over a relatively large range of voltage values of AC input signal 111. In some embodiments, DIVC 160 stabilizes the voltage present on node 141 over a range of voltage values of AC input signal 111 from 80 VAC to 300 VAC.

As depicted in FIG. 2, the voltage divider circuit divides the voltage of the rectified signal 169 present on node 169 by a different fraction depending on the state of electrical switching element 166. If electrical switching element 166 is substantially conductive, then resistive element 144 is effectively bypassed, and the ratio of the voltage at voltage node 141 to the voltage at node 169 is $V_{141}/V_{169}=R_{142}/(R_{146}+R_{142})$. If electrical switching element 166 is substantially non-conductive, then resistive element 144 is not bypassed, and the ratio of the voltage at voltage node 141 to the voltage at node 169 is $V_{141}/V_{169}=(R_{142}+R_{144})/(R_{146}+R_{142}+R_{144})$.

Figure 7:
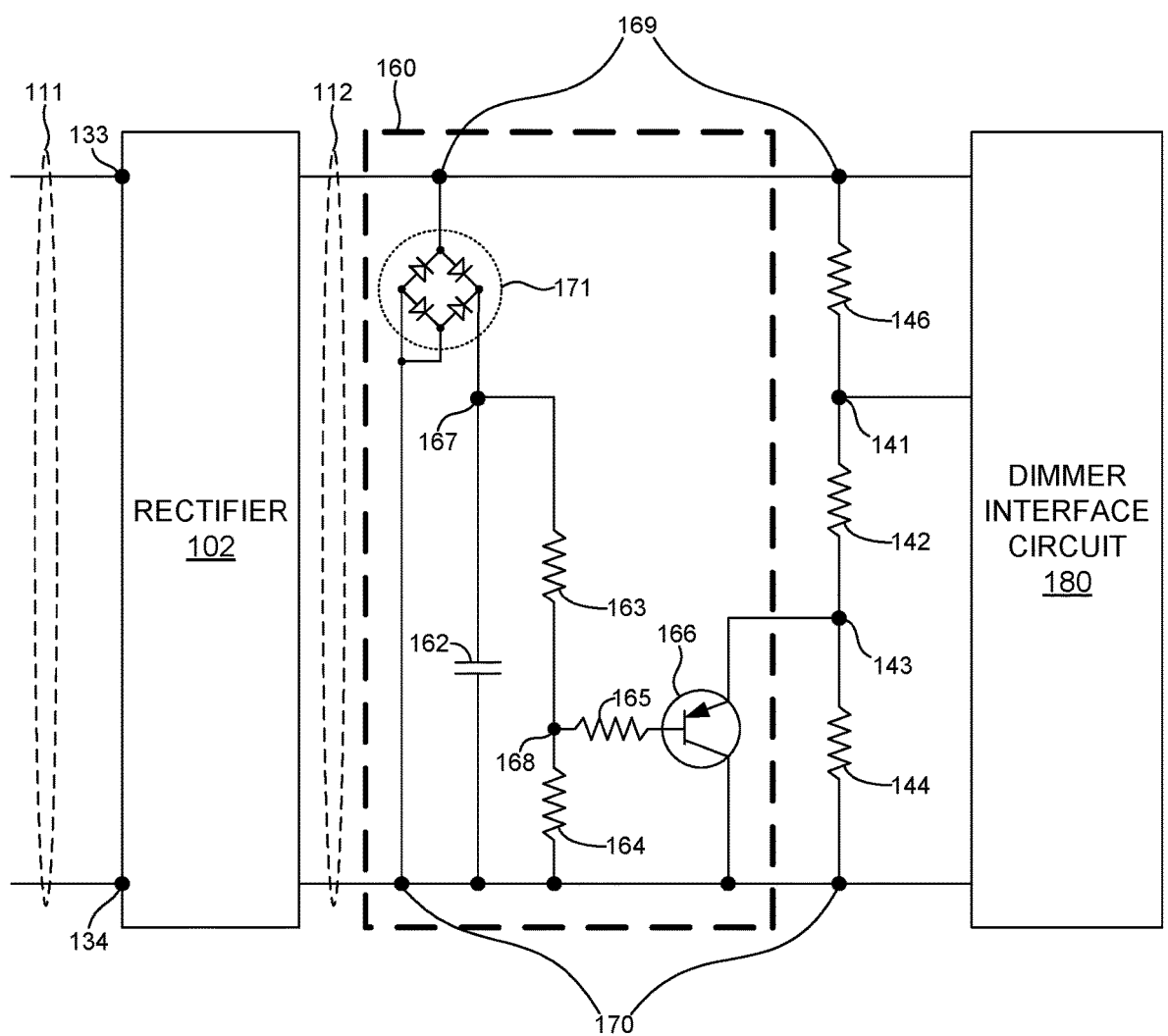
FIG. 7 depicts an illustration of another embodiment of a dynamic input voltage compensator in further detail.

DIVC 160 controls the state of electrical switching element 166 based on the peak voltage of the rectified signal 112. DIVC 160 includes a peak detection circuit that detects a value of the peak voltage of the rectified signal 112. As depicted in FIG. 2, the peak detection circuit includes diode 161 and capacitor 162. Capacitor 162 stores the peak voltage value of the rectified signal 112. Diode 161 prevents the detected voltage from quickly discharging from capacitor 162. In other embodiments, a diode bridge is employed to prevent the detected voltage from quickly discharging from capacitor 162 instead of diode 161. FIG. 7 depicts a diode bridge 171 employed to prevent the detected voltage from quickly discharging from capacitor 162. The detected peak voltage present on node 167 is divided by another voltage divider including resistive elements 163 and 164. The voltage divider circuit divides down the peak voltage of the rectified signal present at node 167 to a reduced voltage present at node 168. As depicted in FIG. 2, the ratio of the voltage at voltage node 167 to the voltage at node 168 is $V_{167}/V_{168}=R_{164}/(R_{163}+R_{164})$. As depicted in FIG. 2, the voltage divider circuit provides the reduced voltage present at node 168 to the control node of electrical switching element 166 via resistive element 165. In the embodiment depicted in FIG. 2 electrical switching element 166 is a bipolar junction transistor. Resistive element 165 converts the voltage signal present on node 168 to a current signal provided to the base of the bipolar junction transistor. In this embodiment, the current present at the base of the bipolar junction transistor is indicative of the peak voltage of rectified signal 112. In another embodiment, electrical switching element 166 is a field effect transistor. In this embodiment, resistor 165 is not included and the gate of the field effect transistor is coupled directly to node 168. In this embodiment, the voltage present at the base of the field effect transistor is indicative of the peak voltage of rectified signal 112.

In general, the elements of DIVC 160 are selected to change the state of electrical switching element 166 depending on the peak voltage value of rectified signal 112. In one example, when the peak voltage value of rectified signal 112 is greater than 180 Volts, DIVC 160 drives electrical switching element 166 to be substantially conductive. As the output terminals of the electrical switching element 166 (e.g., the collector and emitter terminals of a bipolar junction transistor or the source and drain terminals of a field effect transistor) are coupled to nodes 143 and 170, respectively, when electrical switching element 166 is substantially conductive, resistive element 144 is bypassed. Similarly, when the peak voltage value of rectified signal 112 is less than 160 Volts, DIVC 160 releases electrical switching element 166 and electrical switching element 166 is substantially non-conductive. In this state, resistive element 144 participates as part of the voltage divider circuit.

For values of $R_{145}=1$ Megaohm, $R_{142}=300{,}000$ ohm, and $R_{144}=200{,}000$ ohm, $V_{141}/V_{169}=0.23$, when the value of rectified voltage signal 112 is relatively high, and $V_{141}/V_{in}=0.33$ when the value of rectified signal 112 is relatively low. In this manner, dynamic input voltage compensator 140 stabilizes the value of $V_{141}$ over a relatively large range of values of the rectified signal 112.

In some embodiments, the elements of DIVC 160 are selected such that the electrical switching element is substantially conductive when the peak voltage of the rectified signal is greater than 140 Volts.

In other embodiments, the elements of DIVC 160 are selected such that the electrical switching element is substantially non-conductive when the peak voltage of the rectified signal is less than 200 Volts.

Figure 3:
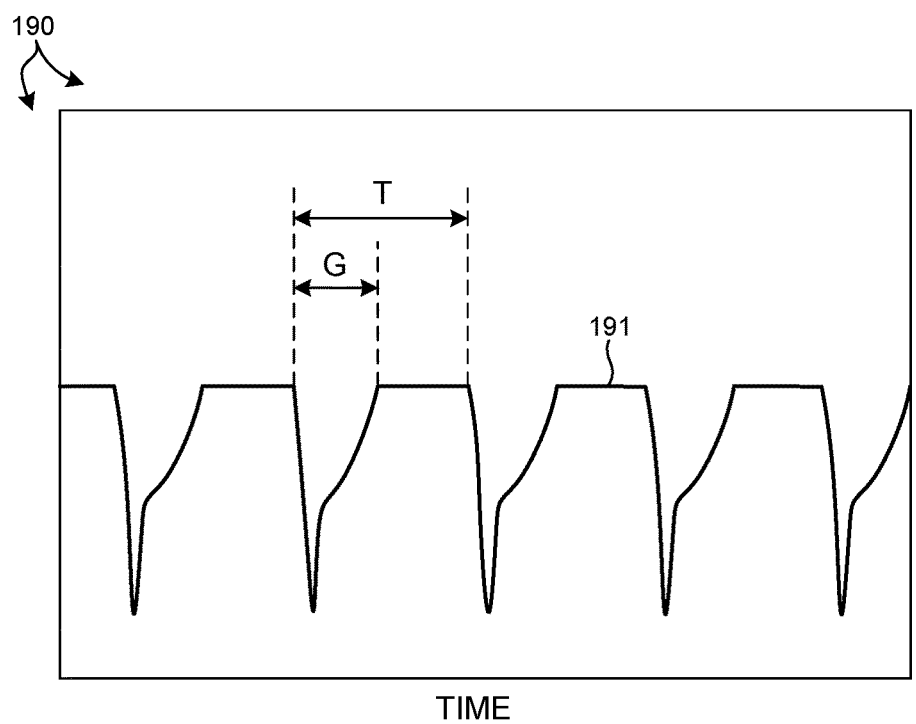
FIG. 3 depicts a plot including a waveform indicative of a time trace of the voltage provided to a dimmer interface circuit for an AC input voltage of 120 Volts.

FIG. 3 depicts a plot 190 including a waveform 191 indicative of a time trace of the voltage present on node 141 as depicted in FIG. 2 for an AC input voltage of 120 Volts. As depicted in FIG. 3, the ratio of the gap time, G, and the cycle time, T, is 48%.

Figure 4:
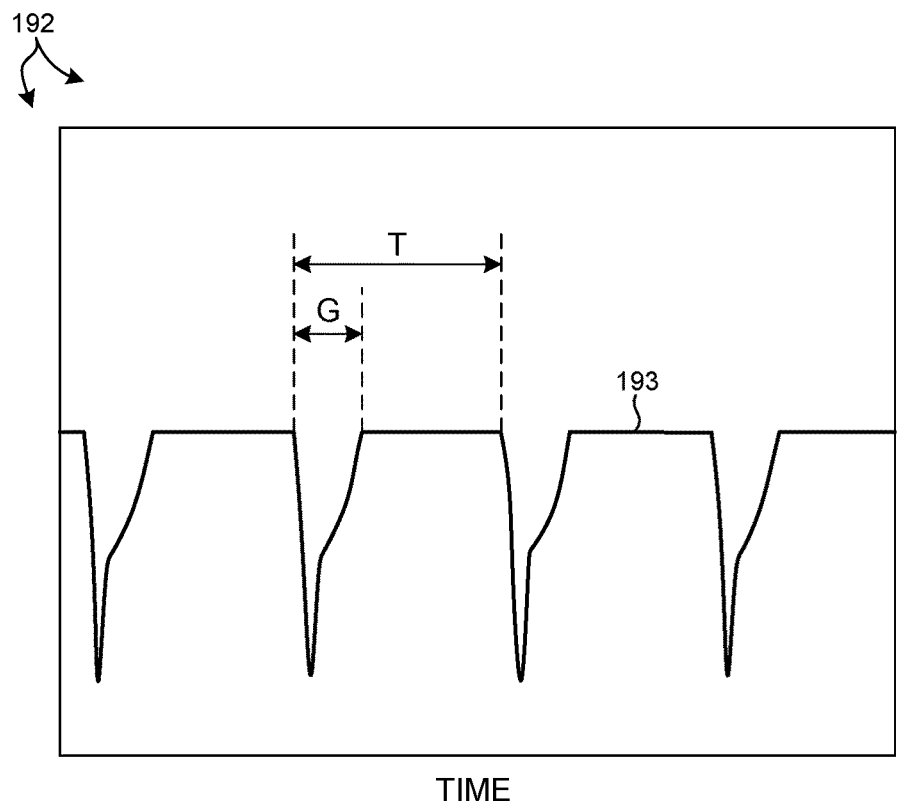
FIG. 4 depicts a plot including a waveform indicative of a time trace of the voltage provided to a dimmer interface circuit for an AC input voltage of 230 Volts.

FIG. 4 depicts a plot 192 including a waveform 193 indicative of a time trace of the voltage present on node 141 as depicted in FIG. 2 for an AC input voltage of 230 Volts. As depicted in FIG. 3, the ratio of the gap time, G, and the cycle time, T, is 30.4%.

Figure 5:
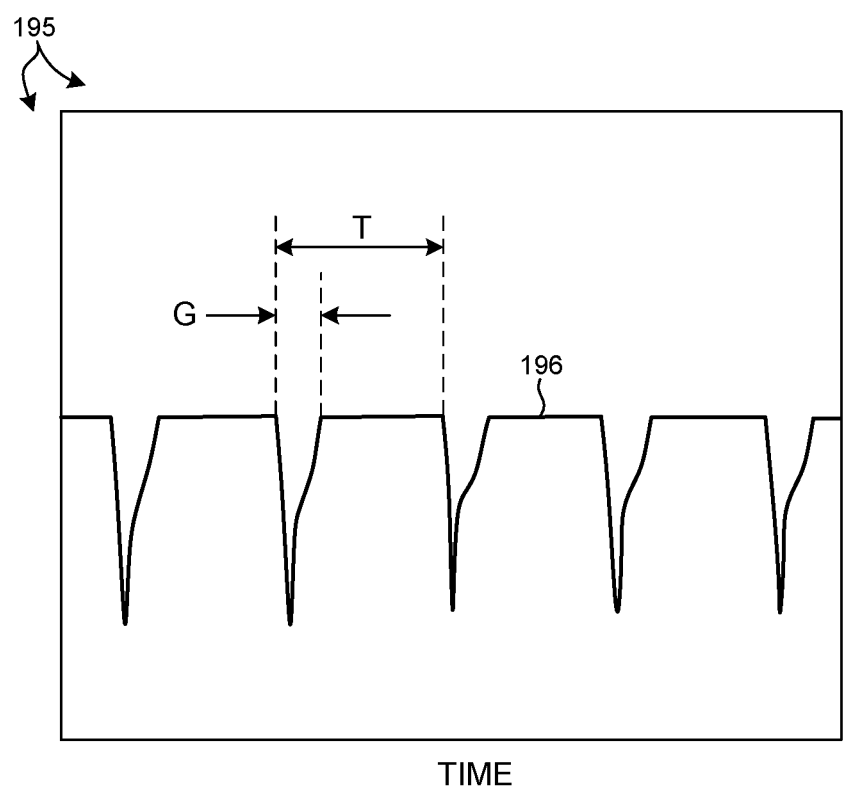
FIG. 5 depicts a plot including a waveform indicative of a time trace of the voltage provided to a dimmer interface circuit for an AC input voltage of 277 Volts.

FIG. 5 depicts a plot 194 including a waveform 195 indicative of a time trace of the voltage present on node 141 as depicted in FIG. 2 for an AC input voltage of 277 Volts. As depicted in FIG. 3, the ratio of the gap time, G, and the cycle time, T, is 26.9%.

As illustrated by FIGS. 3-5, the ratio of the gap time, G, and the cycle time, T, varies from 48% to 26.9% over an AC input voltage range from 120 Volts to 277 Volts. This limited variation maintains stability of the dimmer interface circuitry and dimmer circuitry of an LED driver. Without compensation by DIVC 160, the variation would be much larger and this would destabilize an LED driver trying to operate an LED based illumination device over a range of AC input voltage from 120V to 277V.

Figure 6:
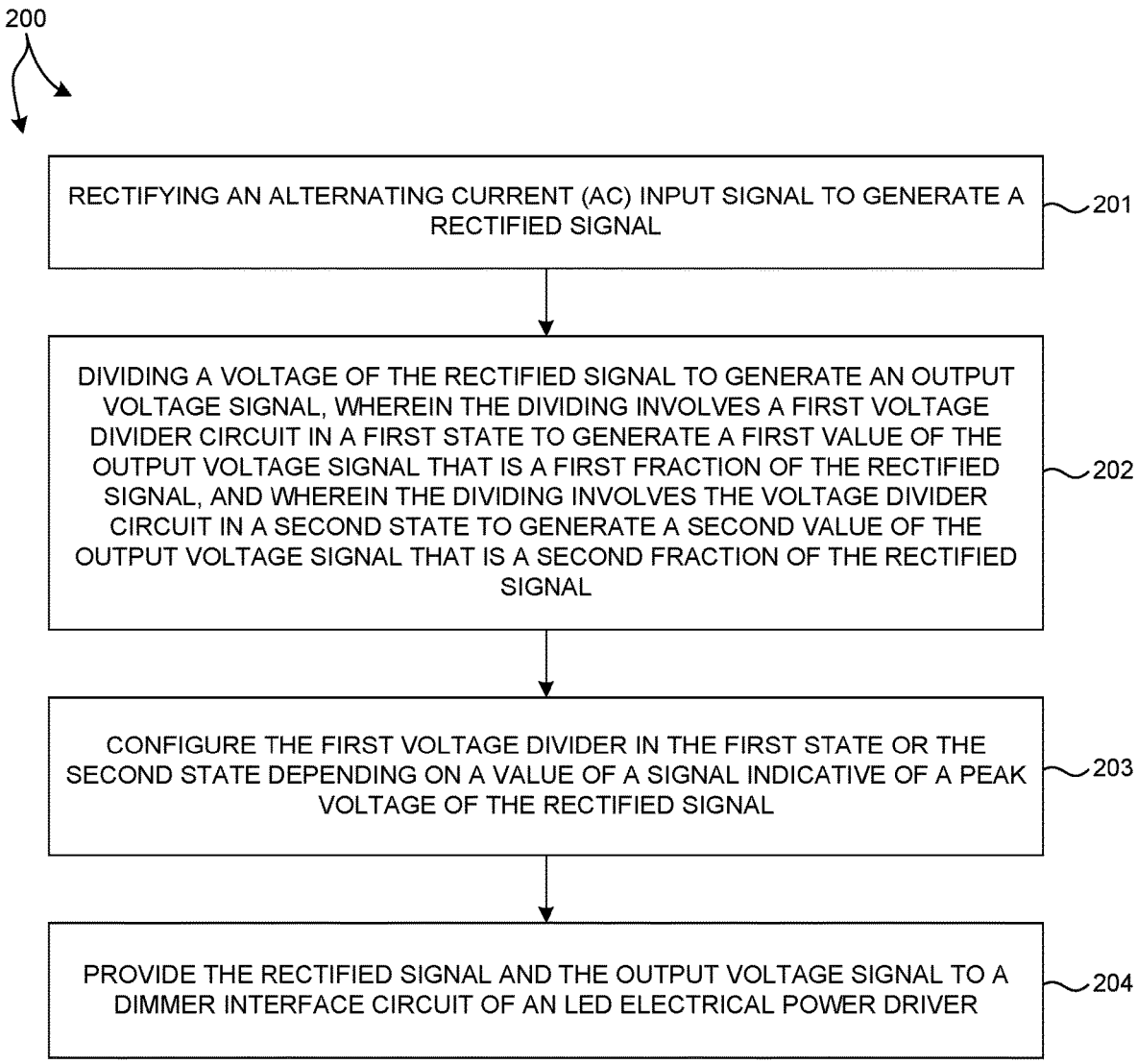
FIG. 6 depicts a flowchart illustrative of a method for stabilizing the value of voltage provided to a dimmer interface circuit over a large range of AC input voltage in at least one novel aspect.

FIG. 6 illustrates a method 200 suitable for implementation by any of the described embodiments of the present invention. While the following description is presented in the context of the described embodiments, it is recognized herein that the particular structural aspects of the described embodiments do not represent limitations and should be interpreted as illustrative only.

In block 201, an Alternating Current (AC) input signal is rectified to generate a rectified signal.

In block 202, a voltage of the rectified signal is divided to generate an output voltage signal. The dividing involves a first voltage divider circuit in a first state to generate a first value of the output voltage signal that is a first fraction of the rectified signal and the voltage divider circuit in a second state to generate a second value of the output voltage signal that is a second fraction of the rectified signal.

In block 203, the first voltage divider is configured in the first state or the second state depending on a value of a signal indicative of a peak voltage of the rectified signal.

In block 204, the rectified signal and the output voltage signal are provided to a dimmer interface circuit of an LED electrical power driver.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An LED electrical power driver, comprising:
a rectifier having a first input node and a second input node and a first output node and a second output node, wherein an Alternating Current (AC) input signal is provided across the first and second input nodes, and wherein a rectified signal is provided by the rectifier across the first and second output nodes;
a dimmer interface circuit having a first node coupled to the first output node of the rectifier, a second input node coupled to the second output node of the rectifier, and a third input node;
a first voltage divider circuit including a first resistive element coupled between the first and third input nodes of the dimmer interface circuit, a second resistive element coupled between the third input node of the dimmer interface circuit and a fourth node, and a third resistive element coupled between the fourth node and the second input node of the dimmer interface circuit; and
a dynamic input voltage compensator electrically coupled to the first and second output nodes of the rectifier, the dynamic input voltage compensator comprising:
a peak detection circuit configured to detect a peak voltage across the first and second output nodes of the rectifier;
a voltage divider circuit configured to divide the detected peak voltage by a predetermined factor to generate a signal indicative of the peak voltage;
an electrical switching element having a first output node coupled to the fourth node, a second output node coupled to the second input node of the dimmer interface circuit, and a control node, wherein the signal indicative of the peak voltage is communicated to the control node, wherein the electrical switching element is substantially conductive when the peak voltage is greater than a first predetermined threshold value, and wherein the electrical switching element is substantially non-conductive when the peak voltage is less than a second predetermined threshold value.

2. The LED electrical power driver of claim 1, wherein the electrical switching element is a bipolar junction transistor or a field effect transistor.

3. The LED electrical power driver of claim 1, wherein the AC input signal is any AC voltage in a range from 80 Volts to 300 Volts.

4. The LED electrical power driver of claim 1, wherein the peak detection circuit includes a diode and a capacitor.

5. The LED electrical power driver of claim 1, wherein the peak detection circuit includes a diode bridge and a capacitor.

6. The LED electrical power driver of claim 1, wherein the switching element is substantially conductive when the peak voltage is greater than 140 Volts.

7. The LED electrical power driver of claim 1, wherein the switching element is substantially non-conductive when the peak voltage is less than 200 Volts.

8. An LED electrical power driver, comprising:
a rectifier configured to receive an Alternating Current (AC) input signal and generate a rectified signal;
a first voltage divider circuit electrically coupled to the rectifier, wherein the first voltage divider circuit generates an output voltage signal that is a fraction of the rectified signal, wherein the first voltage divider circuit in a first state generates a first value of the output voltage that is a first fraction of the rectified signal, and wherein the first voltage divider circuit in a second state generates a second value of the output voltage that is a second fraction of the rectified signal;
a Dynamic Input Voltage Compensator (DIVC) electrically coupled to the rectifier and the first voltage divider circuit, wherein the DIVC receives the rectified signal and configures the first voltage divider in the first state or the second state depending on a value of a signal indicative of a peak voltage of the rectified signal; and
a dimmer interface circuit electrically coupled to the rectifier and the first voltage divider, wherein the dimmer interface circuit receives the rectified signal and the output voltage signal.

9. The LED electrical power driver of claim 8, the DIVC comprising:
a peak detection circuit configured to detect a value of the peak voltage of the rectified signal;
a second voltage divider circuit electrically coupled to the peak detection circuit, the second voltage divider circuit divides the detected value of the peak voltage by a predetermined factor to generate the signal indicative of the peak voltage of the rectified signal; and
an electrical switching element electrically coupled to the first voltage divider circuit and the second voltage divider circuit, the electrical switching element receives the signal indicative of the peak voltage of the rectified signal on a control node of the electrical switching element, wherein the electrical switching element is substantially conductive or substantially non-conductive depending on the value of the signal indicative of the peak voltage of the rectified signal, wherein the first voltage divider circuit is in the first state when the electrical switching element is substantially conductive, and wherein the first voltage divider circuit is in the second state when the electrical switching element is substantially non-conductive.

10. The LED electrical power driver of claim 9, wherein the electrical switching element is a bipolar junction transistor or a field effect transistor.

11. The LED electrical power driver of claim 8, wherein the AC input signal is any AC voltage in a range from 80 Volts to 300 Volts.

12. The LED electrical power driver of claim 9, wherein the peak detection circuit includes a diode and a capacitor.

13. The LED electrical power driver of claim 9, wherein the peak detection circuit includes a diode bridge and a capacitor.

14. The LED electrical power driver of claim 9, wherein the switching element is substantially conductive when the peak voltage of the rectified signal is greater than 140 Volts.

15. The LED electrical power driver of claim 9, wherein the switching element is substantially non-conductive when the peak voltage of the rectified signal is less than 200 Volts.

16. A method comprising:
rectifying an Alternating Current (AC) input signal to generate a rectified signal;
dividing a voltage of the rectified signal to generate an output voltage signal, wherein the dividing involves a first voltage divider circuit in a first state to generate a first value of the output voltage signal that is a first fraction of the rectified signal, and wherein the dividing involves the voltage divider circuit in a second state to generate a second value of the output voltage signal that is a second fraction of the rectified signal;

configuring the first voltage divider in the first state or the second state depending on a value of a signal indicative of a peak voltage of the rectified signal; and providing the rectified signal and the output voltage signal to a dimmer interface circuit of an LED electrical power driver.

17. The method of claim 16, further comprising:

detecting a value of the peak voltage of the rectified signal;

dividing the detected value of the peak voltage by a predetermined factor to generate the signal indicative of the peak voltage of the rectified signal; and receiving the signal indicative of the peak voltage of the rectified signal on a control node of an electrical switching element, wherein the electrical switching element is substantially conductive or substantially non-conductive depending on the value of the signal indicative of the peak voltage of the rectified signal, wherein the first voltage divider circuit is in the first state when the electrical switching element is substantially conductive, and wherein the first voltage divider circuit is in the second state when the electrical switching element is substantially non-conductive.

18. The method of claim 17, wherein the electrical switching element is a bipolar junction transistor or a field effect transistor.

19. The method of claim 16, wherein the AC input signal is any AC voltage in a range from 80 Volts to 300 Volts.

20. The method of claim 17, wherein the electrical switching element is substantially conductive when the peak voltage of the rectified signal is greater than 140 Volts.

21. The method of claim 17, wherein the switching element is substantially non-conductive when the peak voltage of the rectified signal is less than 200 Volts.

22. An Alternating Current/Direct Current (AC/DC) electrical power converter, comprising:

a rectifier having a first input node and a second input node and a first output node and a second output node, wherein an Alternating Current (AC) input signal is provided across the first and second input nodes, and wherein a rectified voltage signal is provided by the rectifier across the first and second output nodes;

a Power Factor Correction Converter (PFCC) having a first input node and a second input node, wherein the first input node of the PFCC is coupled to the first output node of the rectifier and the second input node of the PFCC is coupled to the second output node of the rectifier, the PFCC further comprising:

a voltage divider including a first resistor, a second resistor, and a third resistor, wherein the first resistor is coupled between the first input node of the PFCC and a first voltage node, wherein the second resistor is coupled between the first voltage node and a second voltage node, and the third resistor is coupled between the second voltage node and the second input node of the PFCC, and a Dynamic Input Voltage Compensator (DIVC) having a first input node, a second input node, and a transistor, wherein the first input node of the DIVC is coupled to the first input node of the PFCC, wherein the second input node of the DIVC is coupled to the second input node of the PFCC, wherein the transistor is coupled to the second voltage node and the second input node of the PFCC, wherein the transistor is substantially conductive when an amplitude of the rectified voltage signal is greater than a predetermined threshold value, and wherein the transistor is substantially non-conductive when the amplitude of the rectified voltage signal is less than the predetermined threshold value.

* * * * *